United States Patent
Murano

[11] Patent Number: 6,098,787
[45] Date of Patent: Aug. 8, 2000

[54] CONVEYOR CHAIN USING AN OIL IMPREGNATED SINTERED BUSHING

[75] Inventor: Tetsuya Murano, Osaka-fu, Japan

[73] Assignee: Tsubakimoto Chain Co., Osaka, Japan

[21] Appl. No.: 09/037,010

[22] Filed: Mar. 9, 1998

[30] Foreign Application Priority Data

Mar. 11, 1997 [JP] Japan ................................. 9-056231

[51] Int. Cl.⁷ ........................... B65G 45/02; B65G 45/08
[52] U.S. Cl. ............................. 198/500; 198/851; 474/91
[58] Field of Search .................................. 198/500, 851, 198/779; 384/127; 474/91

[56] References Cited

U.S. PATENT DOCUMENTS

| | | | |
|---|---|---|---|
| 4,915,511 | 4/1990 | Kotegawa et al. | ................. 384/127 X |
| 4,995,852 | 2/1991 | Takahashi et al. | . |
| 5,454,501 | 10/1995 | Konno et al. | . |

FOREIGN PATENT DOCUMENTS

| | | |
|---|---|---|
| 01171409 | 7/1989 | European Pat. Off. . |
| 06227632 | 8/1994 | European Pat. Off. . |
| 1-149048 | 10/1989 | Japan . |

*Primary Examiner*—Christopher P. Ellis
*Assistant Examiner*—Gene O. Crawford
*Attorney, Agent, or Firm*—Armstrong, Westerman, Hattori, McLeland & Naughton

[57] ABSTRACT

A conveyor chain using an oil impregnated sintered bushing is provided. The conveyor chain using the oil impregnated bushing is high in durability and low in manufacturing cost. A roller is rotatably fitted over the oil impregnated sintered bushing of the conveyor chain. An abrasion loss of the outer peripheral surface of the oil impregnated sintered bushing and an abrasion loss of the inner peripheral surface of the roller are reduced. Furthermore, both sliding noises and burning, which are normally generated between the roller and the oil impregnated sintered bushing, can be prevented. The conveyor chain, which uses an oil impregnated sintered bushing including a roller rotatably fitted over the oil impregnated sintered bushing, is characterized in that the oil impregnated sintered bushing has a sintering density in the range of from approximately 6.0 g/cm³ to 7.1 g/cm³. The conveyor chain is further characterized in that at least an inner peripheral surface of the roller is in contact with an outer peripheral surface of the oil impregnated sintered bushing and the outer peripheral surface of the oil impregnated bushing is formed of resin.

3 Claims, 2 Drawing Sheets

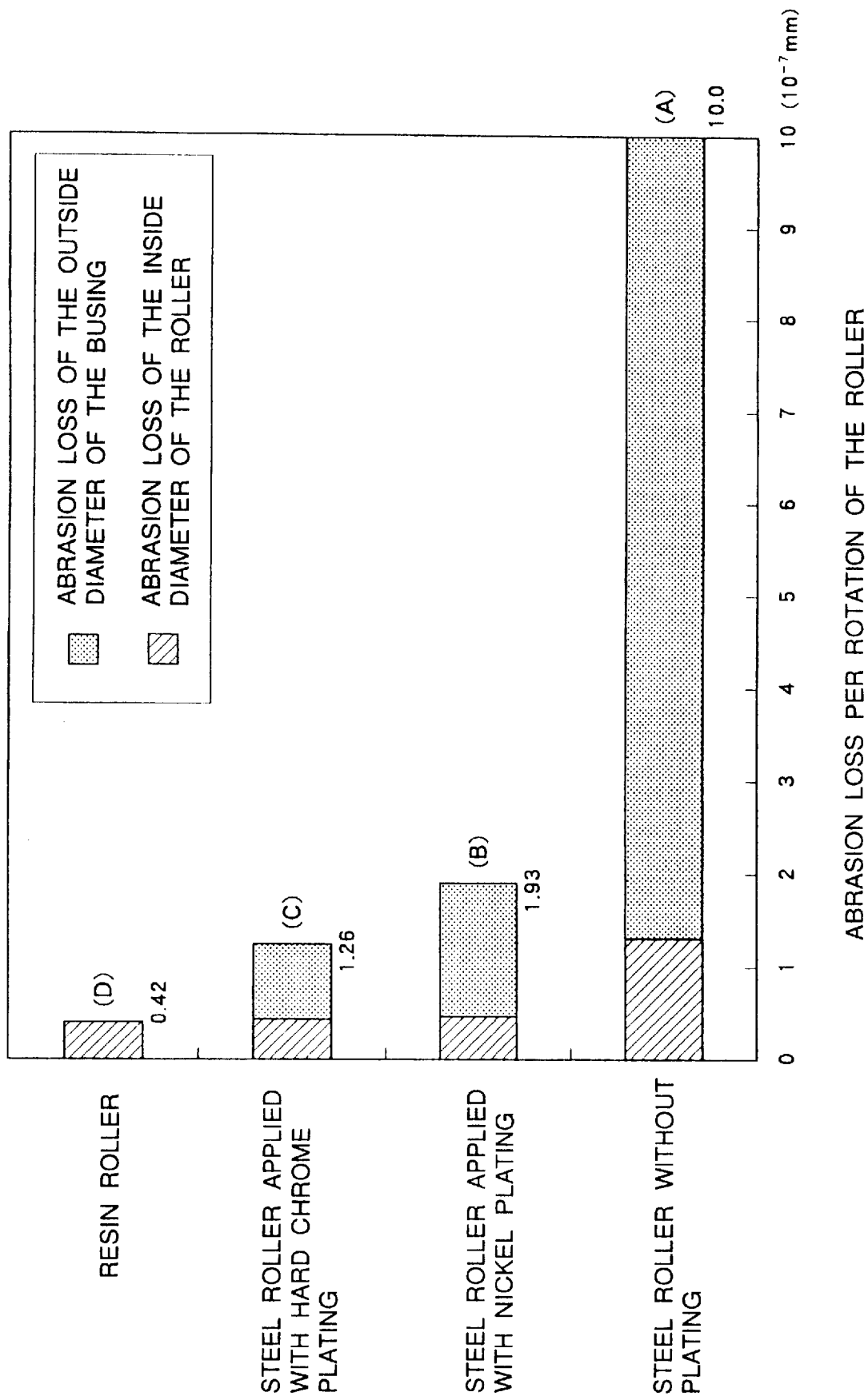

CONVEYOR CHAIN USING AN OIL IMPREGNATED SINTERED BUSHING

FIELD OF THE INVENTION

The present invention generally relates to a conveyor chain and more particularly, to a conveyor chain using an oil impregnated sintered bushing for a bushing having a roller fitted thereover.

DESCRIPTION OF THE RELATED ART

In the past, for a roller chain using an oil impregnated sintered bushing as described, for example, in Japanese Utility Model Application Laid-Open Publication No. Hei 1-149048, steel rollers made of materials such as S15C and SCM 435 are used. However, when a conveyor chain is manufactured by combining such a steel roller with the oil impregnated sintered bushing as it is, fine abraded metal powder generated on the inner surface of the roller is mixed into lubricating oil during use and the quality of the lubricating oil becomes deteriorated. The abraded metal powder floating in the lubricating oil is adhered to and accumulated on the outer peripheral surface of the oil impregnated sintered bushing to block fine oil impregnated pores opened therein. This poses a problem in that the lubricating performance is lowered so that the abrasion of the oil impregnated sintered bushing progresses early.

In view of the foregoing, in the past, nickel plating or hard chrome plating or curing treatment is applied to the surface of the roller to suppress the generation of the abraded metal powder and thereby enhance both the abrasion resistance of the oil impregnated sintered bushing and the life of the chain.

However, even if the plating or curing treatment, as mentioned above, is applied to the roller, there is less effect of reducing the abrasion of the oil impregnated sintered bushing, and the abrasion of the outer peripheral surface of the oil impregnated sintered bushing is not much improved. Moreover, since the step of applying the plating treatment to the roller in the process of manufacturing a chain is high in cost, the manufacturing cost of the chain is high. This high cost has not been sufficiently reflected in the merit of enhancing the life of the chain.

Further, when the abrasion of the outer peripheral surface of the oil impregnated sintered bushing progresses, an oil-film cut occurs between the outer peripheral surface of the oil impregnated bushing and the inner peripheral surface of the roller so that the abrasion is further accelerated. Further, the sliding noise of the contact surfaces occurs between the oil impregnated sintered bushing and the roller, and burning occurs therebetween.

In view of the foregoing, the present invention solves the problems of the abovedescribed related art and provides a conveyor chain using an oil impregnated sintered bushing, which is high in durability and low in manufacturing cost, and in which the abrasion, of both the outer peripheral surface of the oil impregnated sintered bushing and the inner peripheral surface of the roller, is reduced. Furthermore, the sliding noise generated between the roller and the oil impregnated sintered bushing and the burning therebetween can be prevented.

SUMMARY OF THE INVENTION

For achieving the aforesaid object, the present invention provides a conveyor chain using an oil impregnated sintered bushing in which a roller is rotatably fitted over the oil impregnated sintered bushing, wherein the oil impregnated sintered bushing has a sintering density in the range of from 6.0 $g/cm^3$ to 7.1 $g/cm^3$, and at least an inner peripheral surface of the roller is in contact with an outer peripheral surface of the oil impregnated sintered bushing which is formed of resin.

Since the oil impregnated sintered bushing has a sintering density in the range of from 6.0 $g/cm^3$ to 7.1 $g/cm^3$, both practical mechanical strength and oil impregnated performance are provided. Further, since at least an inner peripheral surface of the roller is in contact with an outer peripheral surface of the oil impregnated sintered bushing which is formed of resin, the roller will not generate fine abraded metal powder to deteriorate lubricating oil so that an excellent lubricating state is maintained to prevent burning between the roller and the oil impregnated sintered bushing and to prevent the occurrence of sliding noises during the rotation of the roller.

Moreover, since the inner peripheral surface of the roller itself is in sliding contact with the outer peripheral surface of the oil impregnated sintered bushing and since the inner peripheral surface of the roller has a high self-lubricating property, the abrasion of the outer peripheral surface of the oil impregnated sintered bushing and the inner peripheral surface of the roller is suppressed so as to enhance the life of the chain.

BRIEF DESCRIPTION OF THE DRAWING FIGURES

FIG. 3 is a view showing the results of the abrasion test of the oil impregnated sintered bushing and various rollers.

DETAILED DESCRIPTION OF THE INVENTION

Figure 1:
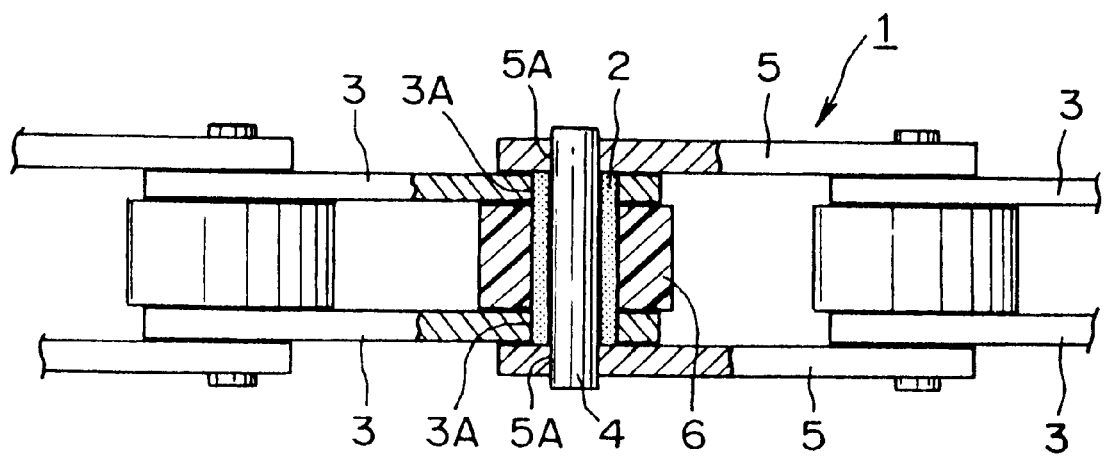
FIG. 1 is a view showing a first embodiment of a conveyor chain using an oil impregnated sintered bushing according to the present invention.

Embodiments of the present invention will be described hereinafter with reference to the drawing figures. FIG. 1 shows a first embodiment of a conveyor chain using an oil impregnated sintered bushing. In the conveyor chain 1 using an oil impregnated sintered bushing 2 (hereinafter merely referred to as a chain 1), outer peripheries on both ends of a hollow cylindrical oil impregnated sintered bushing 2 are respectively fitted in and secured to bushing holes 3A of a pair of inner plates 3. Both ends of a pin 4, rotatably inserted into the bushing 2, are fitted in and secured to pin holes 5A of outer plates 5 arranged on both external sides of the pair of inner plates 3.

Between the pair of opposed inner plates 3, a roller 6 is rotatably fitted over the oil impregnated sintered bushing 2. The roller 6 has a larger outside diameter than the oil impregnated sintered bushing 2 and the larger outside diameter of the roller 6 projects more than the width of the inner plate 3 and the outer plate 5. Furthermore, the larger outside diameter of the roller 6 carries an article to be transported on the outer peripheral surface thereof in a horizontal running path of the chain 1.

The oil impregnated sintered bushing 2 has a tendency that when the sintering density thereof is made small, the oil impregnated performance is enhanced, but the mechanical strength is reduced. However, when the sintered density of the oil impregnated sintered bushing 2 is made large, the mechanical strength is improved, but the oil impregnated performance is reduced. Therefore, the oil impregnated sintered bushing 2 which is used has both sufficient mechanical strength and sufficient oil impregnated performance and also has a sintering density in the range of from approximately 6.0 g/cm$^3$ to 7.1 g/cm$^3$.

As a material for the roller 6, which is fitted over the oil impregnated sintered bushing 2, resin, such as engineering plastics having a high mechanical strength, is used. Generally, polyoxymethylene, polyamide and similar are used in terms of mechanical strength and abrasion resistance. In case where heat resistance is required, polyphenyrenesulfide, polyetherimide, polyvinylidene fluoride and similar are the resins to be used.

Figure 2:
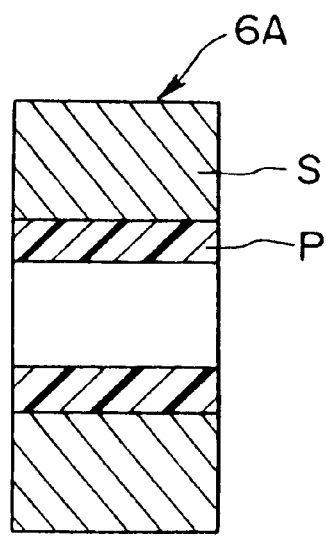
FIG. 2 is a cross-sectional view of a roller in a second embodiment of the conveyor chain using an oil impregnated sintered bushing according to the present invention.

Further, FIG. 2 is a cross sectional view of a roller 6A according to a second embodiment of the conveyor chain 1 using the oil impregnated sintered bushing 2 of the present invention. The roller 6A is of a concentric 2-layer construction. An outer peripheral portion S is made of metal and is fitted so as to be external of a bearing portion P, which is made of resin rotatably fitted over the oil impregnated sintered bushing 2.

The bearing portion P, which is made of resin, is formed of a resin material similar to that of the roller 6 in the first embodiment. As the material for the outer peripheral portion S, which is made of metal, such as carbon steel and alloy steel (for example, chrome molybdenum, stainless steel, etc.), and non-ferrous metal, such as aluminum, can be used. In the second embodiment, other members constituting the chain (not shown) are similar to those of the first embodiment, shown in FIG. 1, and will not be described again here.

FIG. 3 shows the results of the abrasion test of the oil impregnated sintered bushing 2 and the roller 6 in connection with both the conveyor chain 1 using the oil impregnated sintered bushing 2 according to the present invention and various conventional conveyor chains using an oil impregnated sintered bushing 2.

For the abrasion test, an oil impregnated sintered article having an outer diameter of approximately 12.25 mm, an inside diameter of approximately 8.05 mm, a width of approximately 24.28 mm, and a sintering density ranging from approximately 6.0 g/cm$^3$ to 6.2 g/cm$^3$ is used for the oil impregnated sintered bushing 2.

Four different kinds of rollers 6 were used for the test. All of the four different kinds of rollers 6 were of the same shape and had an outside diameter of approximately 31.8 mm, an inside diameter of approximately 12.76 mm, and a width of approximately 15.5 mm. More particularly, the four different kinds of rollers 6 used in the test were as follows: (A) a steel roller of a hardened article corresponding to SCM 435; (B) a steel roller in which nickel plating is applied to a hardened article corresponding to SCM 435; (C) a steel roller in which hard chrome plating is applied to a hardened article corresponding to SCM 435; and (D) a resin roller, the entirety of which is formed of polyoxymethylene. Each of the four various rollers is fitted over the oil impregnated sintered bushing 2 for the abrasion test.

Although not shown, the abrasion test was conducted in such a manner that in consideration of the actual load conditions of the conveyor chain, an oil impregnated sintered bushing, having each of the four above-described various rollers fitted thereover, was secured to a lever having one end oscillatorily mounted on a fixed support portion. The outer peripheral surface of the roller was pressed against the outer peripheral surface of a rotary drum having an outside diameter of approximately 400 mm. A weight of approximately 40 kgf was suspended on the other end of the lever. In this state, the rotary drum was driven by a motor so that the roller was friction-driven relative to the oil impregnated sintered bushing which was secured to the lever by the rotary drum and which was rotated for a predetermined time at a roller surface speed of approximately 30 m/min.

After the stoppage of the rotary drum, the abrasion loss of the inside diameter of the four various rollers and the outside diameter of the oil impregnated sintered bushing was measured to calculate the abrasion loss of the outside diameter of the bushing and the inside diameter of the roller, per one rotation of the roller, from the total number of revolutions of the rotary drum.

As shown in FIG. 3, in the case where the steel roller (A) is combined with the oil impregnated sintered bushing, both the outside diameter of the oil impregnated sintered bushing and inside diameter of the roller are large in abrasion loss. In the case where the steel roller (B), having a nickel plating applied thereto, is used, the total abrasion loss, of the inside diameter of the roller and the outside diameter of the oil impregnated sintered bushing, was reduced by approximately [@0001]/5# as compared with the total abrasion loss of the steel roller (A). In the case where the steel roller (C), having a hard chrome plating applied thereto, is used, the total abrasion loss was further reduced by approximately [@0001]/8# as compared with the total abrasion loss of the steel roller (A).

Further, in the case where the roller (D), made of resin, is used, the abrasion loss of the outside diameter of the oil impregnated sintered bushing was reduced to 0 (less than the measured limit value). The abrasion loss of the inside diameter of the roller was less than that of any of the other rollers. The total abrasion loss between the inside diameter of the roller and the outside diameter of the oil impregnated sintered bushing was reduced by approximately [@0001]/24# as compared with the total abrasion loss of the steel roller (A).

As described above, according to the conveyor chain using an oil impregnated sintered bushing of the present invention, since the sintering density in the range from approximately 6.0 g/cm$^3$ to 7.1 g/cm$^3$ is used for the oil impregnated sintered bushing, the practical abrasion resistance, mechanical strength and oil impregnated performance are improved.

Further, since at least the inner peripheral surface is in contact with the outer peripheral surface of the oil impregnated sintered bushing of the roller fitted over the oil impregnated bushing and is formed of resin, the roller will not generate fine abraded metal powder to deteriorate the quality of the lubricating oil so that an excellent lubricating state is maintained to prevent burning between the roller and the oil impregnated sintered bushing and to prevent the occurrence of sliding noises during the rotation of the roller, thus providing quiet and smooth running of the chain.

Moreover, since the inner peripheral surface of the roller itself is in sliding contact with the outer peripheral surface of the oil impregnated sintered bushing and since the inner peripheral surface of the roller has a high self-lubricating property, the abrasion of the outer peripheral surface of the oil impregnated sintered bushing and the inner peripheral surface of the roller is suppressed to enhance the durable life of the chain.

Further, since the steps of expensive plating treatment and curing treatment of the roller can be omitted during the manufacture of the chain, the manufacturing cost of the chain can be reduced.

What is claimed is:

1. A conveyor chain comprising:

a roller;

an oil impregnated sintered bushing, having an outer peripheral surface, and wherein said roller is rotatably fitted over, and in sliding contact with said outer peripheral surface of said oil impregnated sintered bushing, and wherein said oil impregnated sintered bushing has a sintering density in a range of from approximately 6.0 g/cm$^3$ to 7.1 g/cm$^3$; and at least an inner peripheral surface of said roller, which is in sliding contact with said outer peripheral surface of said oil impregnated sintered bushing, is formed of resin.

2. The conveyor chain as recited in claim 1, wherein said roller is completely formed of said resin.

3. The conveyor chain as recited in claim 1, wherein said roller has a concentric two-layer construction including an outer peripheral portion made of metal and fitted so as to be external of a bearing portion which is made of resin and rotatably fitted over the oil impregnated sintered bushing.

* * * * *